United States Patent
Jan

(10) Patent No.: US 9,523,793 B2
(45) Date of Patent: Dec. 20, 2016

(54) COMPOSITION FOR MANUFACTURING CONTACT LENSES AND METHOD FOR MANUFACTURING CONTACT LENSES BY USING THE SAME

(75) Inventor: Fan-Dan Jan, Taoyuan County (TW)

(73) Assignee: BenQ Materials Corporation, Taoyuan (TW)

( * ) Notice: Subject to any disclaimer, the term of this patent is extended or adjusted under 35 U.S.C. 154(b) by 1145 days.

(21) Appl. No.: 13/488,420

(22) Filed: Jun. 4, 2012

(65) Prior Publication Data

US 2013/0056889 A1   Mar. 7, 2013

(30) Foreign Application Priority Data

Sep. 2, 2011   (TW) .............................. 100131653 A

(51) Int. Cl.

| | | |
|---|---|---|
| G02B 1/04 | (2006.01) | |
| C08L 83/00 | (2006.01) | |
| C08F 230/08 | (2006.01) | |
| C08G 77/38 | (2006.01) | |
| C08G 77/388 | (2006.01) | |
| B29D 11/00 | (2006.01) | |
| B29K 83/00 | (2006.01) | |
| B29K 105/00 | (2006.01) | |
| B29K 105/24 | (2006.01) | |

(52) U.S. Cl.
CPC ......... G02B 1/043 (2013.01); B29D 11/00038 (2013.01); C08F 230/08 (2013.01); C08G 77/38 (2013.01); C08G 77/388 (2013.01); *B29K 2083/00* (2013.01); *B29K 2105/0002* (2013.01); *B29K 2105/0005* (2013.01); *B29K 2105/24* (2013.01); *B29K 2995/0092* (2013.01)

(58) Field of Classification Search
CPC ....... G02B 1/043; C08G 77/38; C08G 77/388; C08F 230/08; B29D 11/00038
See application file for complete search history.

(56) References Cited

U.S. PATENT DOCUMENTS

| | | | |
|---|---|---|---|
| 8,952,080 B2 * | 2/2015 | Jan ................................. | 523/107 |
| 2002/0005933 A1 * | 1/2002 | Imafuku ............... | C08F 283/12 |
| | | | 351/159.03 |
| 2014/0371410 A1 * | 12/2014 | Jan ................................. | 526/246 |

FOREIGN PATENT DOCUMENTS

| | | |
|---|---|---|
| JP | 2000-501853 A | 2/2000 |
| TW | 491951 | 6/2002 |

* cited by examiner

*Primary Examiner* — Mathieu Vargot
(74) *Attorney, Agent, or Firm* — CKC & Partners Co., Ltd.

(57) ABSTRACT

A composition is provided for manufacturing contact lenses including a siloxane macromer represented by the following formula (I):

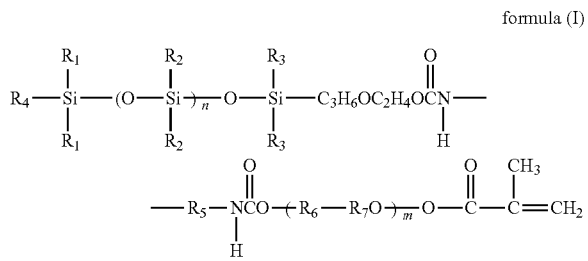

formula (I)

wherein R1, R2 and R3 are independently C1-C4 alkyl groups, R4 is C1-C6 alkyl group, R5 is a residue obtained by removing NCO group from an aliphatic or aromatic diisocyanate, R6 and R7 are independently alkylene groups, and n is an integer of about 4-80, m is an integer of about 3-40; a crosslinking agent or a siloxane macromer represented by the following formula (II), wherein p is an integer of 4-80 and q is an integer of 3-40:

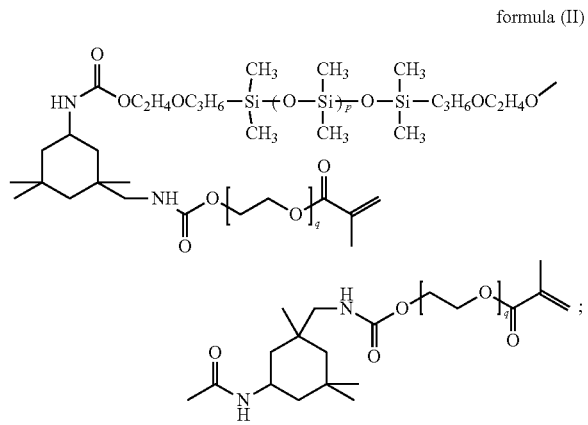

formula (II)

and an initiator.

13 Claims, No Drawings ical Field

COMPOSITION FOR MANUFACTURING CONTACT LENSES AND METHOD FOR MANUFACTURING CONTACT LENSES BY USING THE SAME

CROSS-REFERENCE TO RELATED APPLICATION

This application claims the priority benefit of Taiwan Application Serial No. 100131653, filed Sep. 2, 2011, the full disclosure of which is incorporated herein by reference.

BACKGROUND

Technical Field

The present invention relates to a composition for manufacturing contact lenses. More particularly, the present invention relates to a composition for manufacturing contact lenses comprising hydrophilic siloxane macromer.

Description of Related Art

The hydrogel contact lenses are made from hydrogel materials, such as poly-2-hydroxyethyl methacrylate (p-HEMA), and the strength of 2-hydroxyethyl methacrylate (HEMA) can be improved by adding crosslinking agent like ethylene glycol dimethacrylate (EGDMA). Since the water content of the HEMA is only about 38.8%, the hydrophilic monomer, for example N-vinylpyrrolidone, N,N-dimethylacrylamide and methyl acrylic acid, is added to improve the water content of such materials for the contact lenses. With the addition of the hydrophilic monomer, the water content of the contact lenses can increase up to 80%. However, the higher water content of the contact lenses is, the lower tension and toughness thereof become. The water content of contact lenses generally ranges from about 45% to 58%, but the real oxygen permeability can only reach about 15-35 regardless the further improvement of the water content.

Silicone hydrogel contact lenses have better oxygen permeability than hydrogel contact lenses. Silicone hydrogel contact lenses comprises a silicone polymeric material which was made by polymerizing two siloxane macromers, which have different chemical structures and different molecular weights, and a hydrophilic monomer, such as N-vinylpyrrolidone (NVP), methyl acrylic acid and N,N-dimethylacrylamide.

However, because of the hydrophobic characteristic on the surface of silicone hydrogel contact lenses, it is apt to incur the bacteria breed and eyes irritation. Therefore, an object of the present invention is to provide a composition of contact lenses and a method for manufacturing contact lenses by using the same to surmount the aforesaid disadvantages of the prior art.

SUMMARY

According to an aspect of the present invention, a composition for manufacturing contact lenses is provided.

In an embodiment of the present invention, the composition for manufacturing contact lenses comprises a siloxane macromer represented by the following formula (I), a hydrophilic monomer, a crosslinking agent and an initiator. The formula (I) is

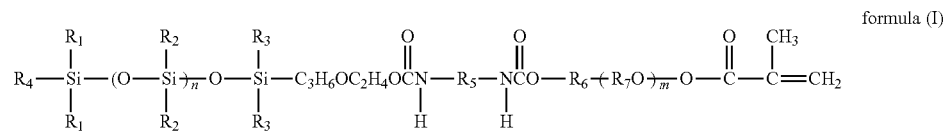

formula (I)

wherein $R_1$, $R_2$ and $R_3$ are independently C1-C4 alkyl groups, $R_4$ is C1-C6 alkyl group, $R_5$ is a residue obtained by removing NCO group from an aliphatic or aromatic diisocyanate, $R_6$ and $R_7$ are independently alkylene groups, and n is an integer of 4-80, m is an integer of 3-40, and the molecular weight of the siloxane macromer of formula (I) is 1,000 to 10,000.

In an embodiment of the present composition for manufacturing contact lenses, the hydrophilic monomer is selected from a group consisting of 2-hydroxyethyl methacrylate (HEMA), N-vinylpyrrol done (NVP), methyl acrylic acid, acrylic acid, glycidyl methacrylate, (methyl) acrylamide, N,N-dimethylacrylamide, vinyl bamate and a combination thereof.

In another embodiment of the present composition for manufacturing contact lenses, the composition for manufacturing contact lenses comprises a siloxane macromer of formula (I) defined as above, a hydrophilic monomer, a siloxane macromer represented by the following formula (II) and an initiator. The formula (II) is

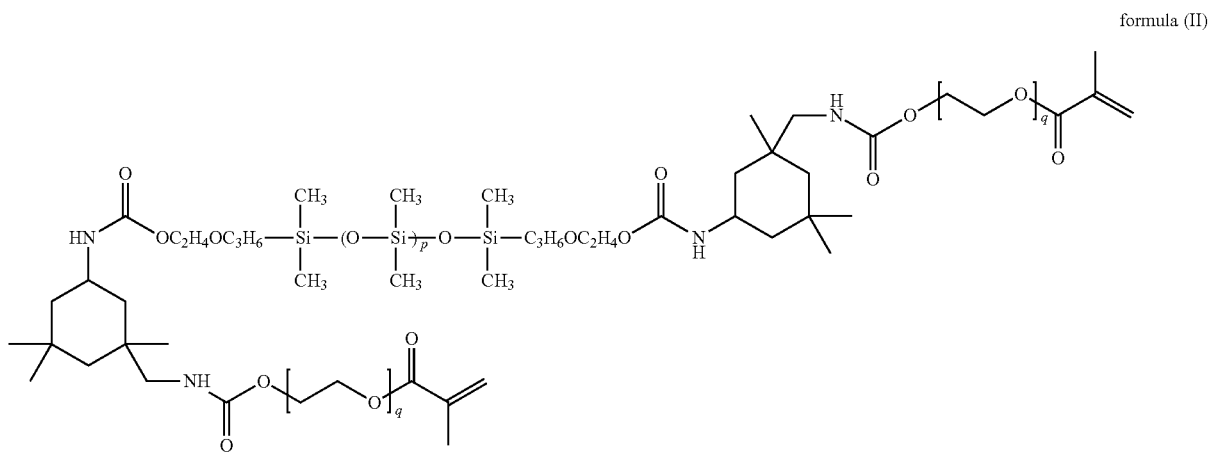

formula (II)

wherein p is an integer of 4-80 and q is an integer of 3-40.

According to a further aspect of the present invention, the composition for manufacturing contact lenses comprises a siloxane macromer of formula (I) defined as above, a hydrophilic monomer, a siloxane macromer of formula (II) defined as above, a crosslinking agent and an initiator.

According to a further another aspect of the present invention, a method for manufacturing the contact lenses is provided.

In an embodiment of the method of the present invention, the method for manufacturing the contact lenses comprises the following steps. First, a siloxane macromer of formula (I) defined as above, a hydrophilic monomer, a crosslinking agent and an initiator are mixed to form a mixture. Then, the mixture is injected into a mold of contact lens and heated to form contact lenses.

In another embodiment of the method of the present invention, the method for manufacturing the contact lenses comprises the following steps. First, a siloxane macromer of formula (I) defined as above, a hydrophilic monomer, a siloxane macromer of formula (II) defined as above and an initiator are mixed to form a mixture. Then, the mixture is injected into a mold of contact lens and heated to form contact lenses.

In still another embodiment of the method of the present invention, the method for manufacturing the contact lenses comprises the following steps. First, a siloxane macromer of formula (I) defined as above, a hydrophilic monomer, a siloxane macromer of formula (II) defined as above, a crosslinking agent and an initiator are mixed to form a mixture. Then, the mixture is injected into a mold of contact lens and heated to form contact lenses.

The above and other aspects of the invention will become better understood with regard to the following detailed description of the preferred but non-limiting embodiment(s).

DETAILED DESCRIPTION

Accordingly, a composition for manufacturing contact lenses and a method for manufacturing contact lenses by using the same are provided. In the following detailed description, for purposes of explanation, numerous specific details are set forth in order to provide a thorough understanding of the disclosed embodiments. It will be apparent, however, that one or more embodiments may be practiced without these specific details.

According to an aspect of the present invention, a composition for manufacturing contact lenses is provided. The contact lenses have hydrophilic surface, excellent oxygen permeability and high water content.

In an embodiment of the present invention, the composition for manufacturing contact lenses comprises a siloxane macromer represented by the following formula (I), a hydrophilic monomer, an initiator and a crosslinking agent or a siloxane macromer represented by the following formula (II), wherein the formula (I) is

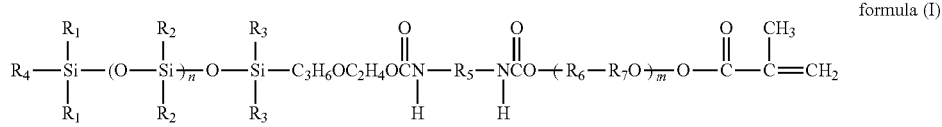

formula (I)

wherein R1, R2 and R3 are independently C1-C4 alkyl groups, R4 is C1-C6 alkyl group, R5 is a residue obtained by removing NCO group from an aliphatic or aromatic diisocyanate, R6 and R7 are independently alkylene groups, and n is an integer of 4-80, m is an integer of 3-40 and the molecular weight of the siloxane macromer of formula (I) is 1,000 to 10,000.

And the formula (II) is

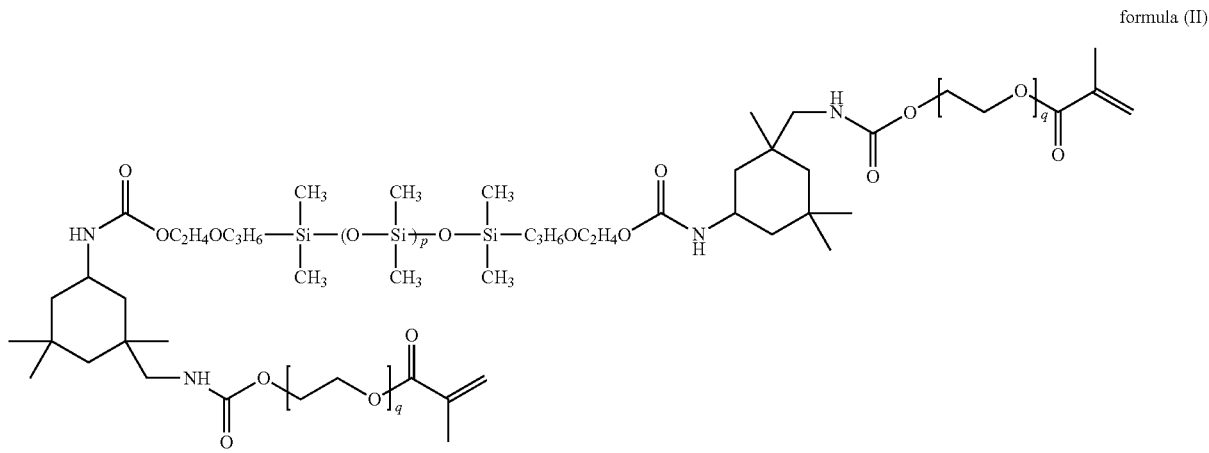

formula (II)

wherein p is an integer of 4-80, q is an integer of 3-40.

The hydrophilic monomer is selected from a group consisting of 2-hydroxyethyl methacrylate (HEMA), N-vinylpyrrolidone (NVP), methyl acrylic acid, acrylic acid, glycidyl methacrylate, (methyl) acrylamide, N,N-dimethylacrylamide, vinyl bamate and a combination thereof. In an embodiment of composition for manufacturing contact lenses of the present invention, the hydrophilic monomer is a combination of HEMA and NVP.

In addition, the siloxane macromer of formula (II) defined as above provides a crosslinking function. In an embodiment of composition for manufacturing contact lenses of the present invention, the present composition comprises one of the siloxane macromer of formula (II) and a crosslinking agent. In another embodiment of composition for manufacturing contact lenses of the present invention, the present composition for manufacturing contact lenses comprises both the siloxane macromer of formula (II) and a crosslinking agent.

In an embodiment of composition for manufacturing contact lenses of the present invention, the siloxane macromer of formula (I) comprises but not limited to a siloxane macromer represented by the following formula (III):

trimethacrylate, vinyl methacrylate, ethylenediamine dimethyl acrylamide, glycerol dimethacrylate, triallyisoeyanurate or triallyl cyanurate. In a preferred embodiment of composition for manufacturing contact lenses of the present invention, the crosslinking agent is EGDMA.

The initiator suitably used in conventional compositions for manufacturing contact lenses can be used in the composition of the present invention, such as, for example, azobisisoheptonitrile (ADVN), 2,2'-azobis(isoheptonitrile) (AIBN), 2,2'-azobis(2,4-dimethylvaleronitrile), 2,2'-azobis (2-methyl-propanenitrile), 2,2'-azobis(2-methyl-butanenitrile) or benzoyl peroxide. In a preferred embodiment of composition for manufacturing contact lenses of the present invention, the initiator is ADVN.

In an embodiment of composition for manufacturing contact lenses of the present invention, the composition of contact lenses comprises a siloxane monomer of formula (I) defined as above, a hydrophilic monomer, a crosslinking agent and an initiator. In the composition of this embodiment, the siloxane monomer of formula (I) is present at an amount of 30 to 40 parts by weight, the hydrophilic monomer is present at an amount of 40 to 65 parts by weight, the

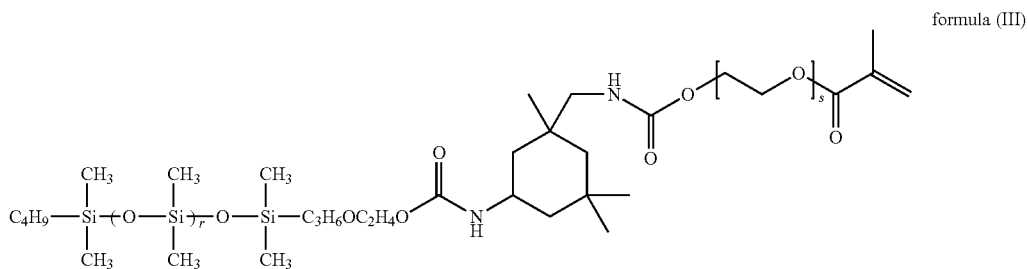

formula (III)

wherein r is an integer of 4-80 and s is an integer of 3-40.

Moreover, the crosslinking agent suitably used in conventional compositions for manufacturing contact lenses can be used in the composition of the present invention, such as, for example, ethylene glycol dimethacrylate (EGDMA), tetraethylene ethylene glycol dimethacrylate (TEGDMA), tetraethylene ethylene glycol dimethacrylate (TrEGDMA), Poly(ethylene glycol) dimethacrylate, trimethylolpropane crosslinking agent is present at an amount of 1 to 10 parts by weight and the initiator is present at an amount of 0.1 to 1 parts by weight based on the total amount of the composition. Furthermore, the hydrophilic monomer used in this embodiment is a combination of HEMA and NVP, wherein the HEMA is present at an amount of 1 to 5 parts by weight and the NVP is present at an amount of 40 to 60 parts by weight based on the total amount of the composition.

In another embodiment of composition for manufacturing contact lenses of the present invention, the composition for manufacturing contact lenses comprises a siloxane monomer of formula (I) defined as above, a hydrophilic monomer, a crosslinking agent, an initiator and a siloxane monomer of formula (II) defined as above. In this embodiment, the siloxane monomer of formula (I) is present at an amount of 20 to 45 parts by weight, the hydrophilic monomer is present at an amount of 40 to 75 parts by weight, the crosslinking agent is present at an amount of 1 to 5 parts by weight, the siloxane monomer of formula (II) is present at an amount of 5 to 20 parts by weight and the initiator is present at an amount of 0.1 to 1 parts by weight based on the total amount of the composition. Furthermore, the hydrophilic monomer used in this embodiment is a combination of HEMA and NVP, wherein the HEMA is present at an amount of 1 to 20 parts by weight and the NVP is present at an amount of 40 to 55 parts by weight based on the total amount of the composition.

According to another aspect of the present invention, a composition for manufacturing contact lenses is provided. The contact lenses have hydrophilic surface, excellent oxygen permeability and high water content.

In an embodiment of composition for manufacturing contact lenses of the present invention, the composition of contact lenses comprises a siloxane monomer of formula (I) defined as above, a hydrophilic monomer, an initiator and a siloxane monomer of formula (II) defined as above. In the composition of this embodiment, the siloxane monomer of formula (I) is present at an amount of 15 to 45 parts by weight, the hydrophilic monomer is present at an amount of 40 to 75 parts by weight, the siloxane monomer of formula (II) is present at an amount of 5 to 30 parts by weight and the initiator is present at an amount of 0.1 to 1 parts by weight based on the total amount of the composition. Furthermore, the hydrophilic monomer used in this embodiment is a combination of HEMA and NVP, wherein the HEMA is present at an amount of 1 to 15 parts by weight and the NVP is present at an amount of 40 to 60 parts by weight based on the total amount of the composition.

In addition, the composition for manufacturing contact lenses can further comprise but not limited to a dye and an anti-UV agent.

According to a further aspect of the present invention, a method for manufacturing contact lenses is provided. The contact lenses made by the present method have hydrophilic surface, excellent oxygen permeability and high water content. The method can comprise but not limited to the following steps.

First, a siloxane macromer represented by the following formula (I), a hydrophilic monomer, an initiator and a crossling agent or a siloxane macromer represented by the following formula (II) are mixed to form a mixture. Then, the mixture is injecting into a mold of contact lens and heating the mixture to form contact lenses. The molecular weight of the siloxane macromer of formula (I) is 1,000 to 10,000. The formula (I) is

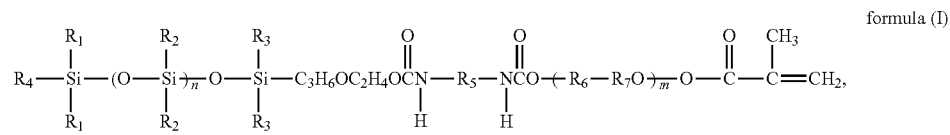

formula (I)

wherein R1, R2 and R3 are independently C1-C4 alkyl groups, R4 is C1-C6 alkyl group. R5 is a residue obtained by removing NCO group from an aliphatic or aromatic diisocyanate, R6 and R7 are independently alkylene groups, and n is an integer of 4-80, m is an integer of 3-40;
and the formula (II) is

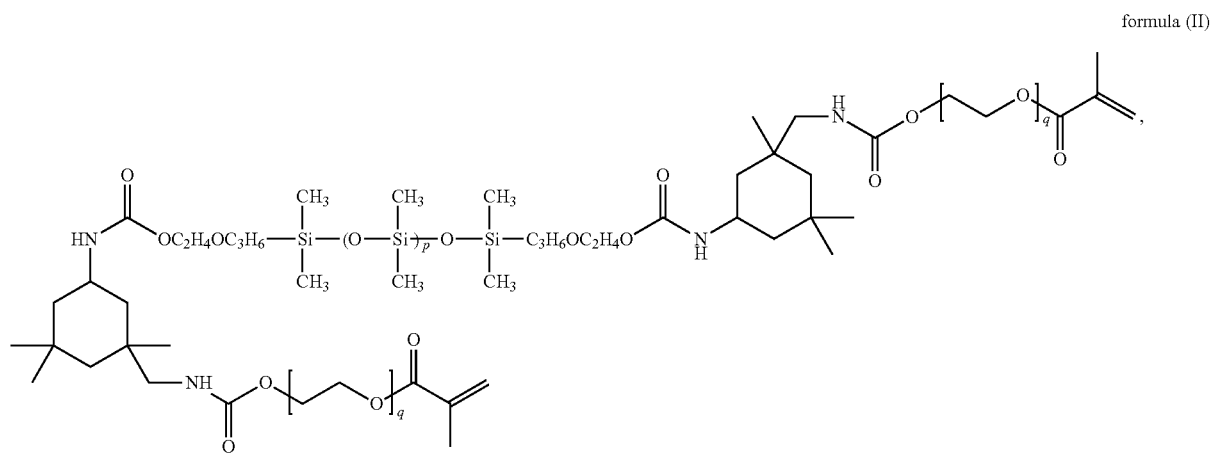

formula (II)

wherein p is an integer of 4-80 and q is an integer of 3-40.

The hydrophilic monomer is selected from a group consisting of 2-hydroxyethyl methacrylate (HEMA), N-vinylpyrrolidone (NVP), methyl acrylic acid, acrylic acid, glycidyl methacrylate, (methyl)acrylamide, N,N-dimethylacrylamide, vinyl bamate and a combination of said materials thereof. In an embodiment of the method of the present invention, the hydrophilic monomer is a combination of HEMA and NVP.

In addition, the siloxane macromer of formula (II) provides a crosslinking function. In an embodiment of the method of the present invention, the mixture comprises one of the siloxane macromer of formula (II) and crosslinking agent. In another embodiment of the method of the present invention, the mixture comprises both the siloxane macromer of formula (II) and crosslinking agent.

In an embodiment of the method of the present invention, the siloxane macromer of formula (I) comprises but not limited to a siloxane macromer represented by the following formula (III):

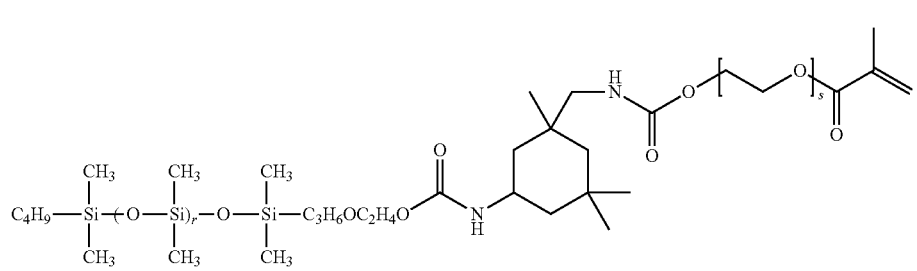

formula (III)

wherein r is an integer of 4-80 and s is an integer of 3-40.

Moreover, the crosslinking agent suitably used in conventional compositions for manufacturing contact lenses can be used in the method of the present invention, such as, for example, ethylene glycol dimethacrylate (EGDMA), tetraethylene ethylene glycol dimethacrylate (TEGDMA), tetraethylene ethylene glycol dimethacrylate (TrEGDMA), Poly (ethylene glycol) dimethacrylate, trimethylolpropane trimethacrylate, vinyl methacrylate, ethylenediamine dimethyl acrylamide, glycerol dimethacrylate, triallyisoeyanurate or triallyl cyanurate. In a preferred embodiment of the method of the present invention, the crosslinking agent is ethylene glycol dimethacrylate (EGDMA).

Besides, the initiator suitably used in conventional compositions for manufacturing contact lenses can be used in the method of the present invention, such as, for example, azobisisoheptonitrile (ADVN), 2,2'-azobis(isoheptonitrile) (AIBN), 2,2'-azobis(2,4- dimethylvaleronitrile), 2,2'-azobis (2-methyl-propanenitrile), 2,2'-azobis(2-methyl-butanenitrile) or benzoyl peroxide. In a preferred embodiment of the method of the present invention, the initiator is ADVN.

In an embodiment of the method of the present invention, the step of forming the mixture comprises mixing a siloxane monomer of formula (I) defined as above, a hydrophilic monomer, a crosslinking agent and an initiator to form a mixture. In the method of this embodiment, the siloxane monomer of formula (I) is present at an amount of 30 to 40 parts by weight, the hydrophilic monomer is present at an amount of 40 to 65 parts by weight, the crosslinking agent is present at an amount of 1 to 10 parts by weight and the initiator is present at an amount of 0.1 to 1 parts by weight based on the total amount of the mixture. Furthermore, the hydrophilic monomer used in this embodiment is a combination of HEMA and NVP, wherein the HEMA is present at an amount of 1 to 5 parts by weight and the NVP is present at an amount of 40 to 60 parts by weight based on the total amount of the mixture.

In another embodiment of the method of the present invention, the step of forming the mixture further comprises mixing a siloxane monomer of formula (I) defined as above, a hydrophilic monomer, a crosslinking agent, an initiator and a siloxane monomer of formula (II) defined as above to form the mixture. In the method of this embodiment, the siloxane monomer of formula (I) is present at an amount of 20 to 45 parts by weight, the hydrophilic monomer is present at an amount of 40 to 75 parts by weight, the crosslinking agent is present at an amount of 1 to 5 parts by weight, the siloxane monomer of formula (II) is present at an amount of 5 to 20 parts by weight and the initiator is present at an amount of 0.1 to 1 parts by weight based on the total amount of the mixture. Furthermore, the hydrophilic monomer used in this embodiment is a combination of HEMA and NVP, wherein the HEMA is present at an amount of 1 to 20 parts by weight and the NVP is present at an amount of 40 to 55 parts by weight based on the total amount of the mixture.

In still another embodiment of the method of the present invention, the step of forming the mixture comprises mixing a siloxane monomer of formula (I) defined as above, a hydrophilic monomer, an initiator and a siloxane monomer of formula (II) defined as above to form the mixture. In the method of this embodiment, the siloxane monomer of formula (I) is present at an amount of 15 to 45 parts by weight, the hydrophilic monomer is present at an amount of 40 to 75 parts by weight, the siloxane monomer of formula (II) is present at an amount of 5 to 30 parts by weight and the initiator is present at an amount of 0.1 to 1 parts by weight based on the total amount of the mixture. Furthermore, the hydrophilic monomer used in this embodiment is a combination of HEMA and NVP, wherein the HEMA is present at an amount of 1 to 15 parts by weight and the NVP is present at an amount of 40 to 60 parts by weight based on the total amount of the mixture.

In addition, the mixture could further comprise but not limited to a dye and an UV-blocking agent or other materials suitable used in the prior contact lenses for providing specific functions.

After forming the mixture, the mixture injected into a mold of contact lens and heating the mixture to form contact lenses.

The heating treatment is conducted at a temperature in the range between about 30° C. to about 150° C., the reaction time is in the range from about 1 hour to 12 hours. In an embodiment of the method of the present invention, the heating treatment is conducted at 30-70° C. for 0-2 hours, 70-100° C. for 2-4 hours and 100-150° C. for 4-12 hours.

After the heating treatment, the method of the present invention can further comprise a water-imparting treatment.

In an embodiment of the method of the present invention, the water-imparting treatment comprises but not limited to the following steps.

Firstly, the contact lenses are soaked in alcohol solution, then soaked in water, and finally soaked in a buffer solution to be equilibria.

The water content of the contact lenses according to the present invention is in the range of about 25% to 55%, and preferably in the range of 35% to 55%.

Additionally, the oxygen permeability of the contact lenses according to the present invention is more than 80, and preferably more than 100.

The present invention will be explained in further detail with reference to the examples. However, the present invention is not limited to these examples.

EXAMPLE

1. Synthesis of a Siloxane Macromer

A. Synthesis of Siloxane Macromer (A)

(1) The reaction scheme siloxane macromer (A) is shown as follow:

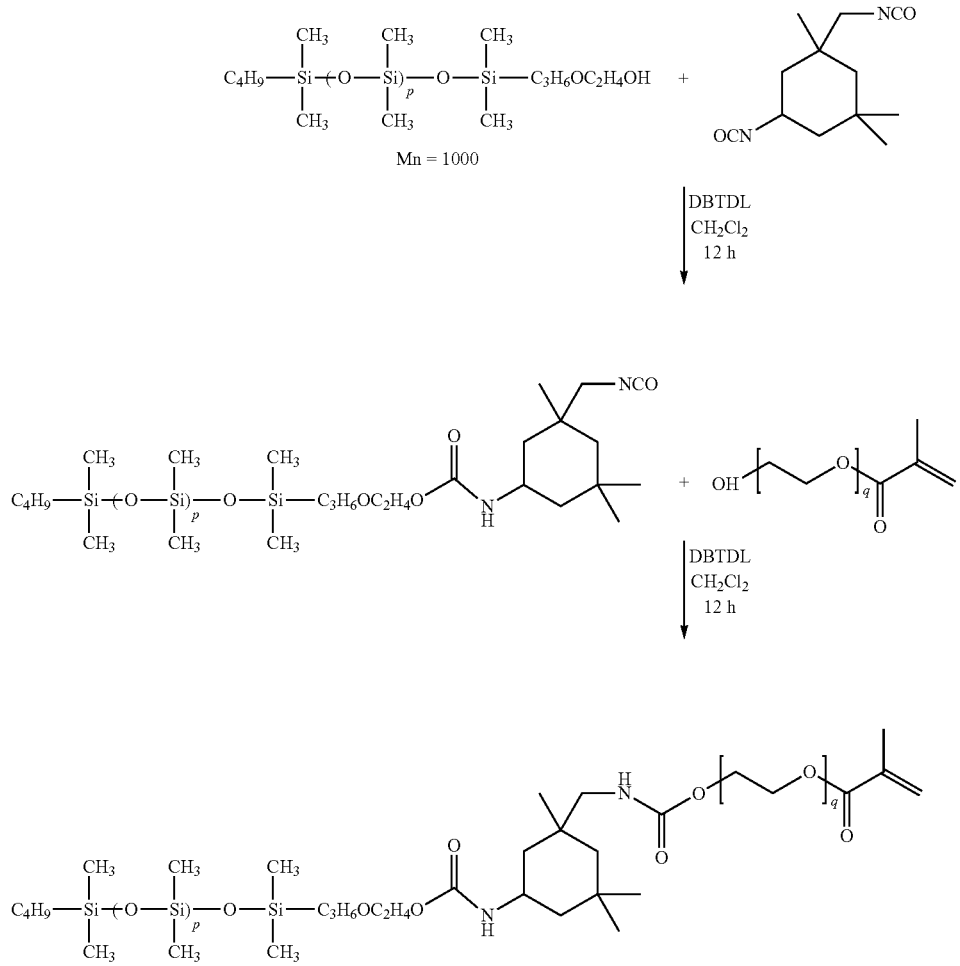

(2) Preparation of Siloxane Macromer (A)

4.44 g of isophorone diisocyanate, 0.0025 g of dibutyltin dilaurate as the catalyst, and 40 mL of methylene chloride were added to a flask, and the solution stirred under a stream of nitrogen. Then, 20 g of α-butyl-ω-[3-(2,2-(dihydroxymethyl)butoxy)propyl]polydimethylsiloxane was accurately weighed and added dropwise to the solution over about 1 hour. After the reaction at room temperature for 12 hours, another 0.0025 g of dibutyltin dilaurate and 7.2 g of polyethylene glycol monomethacrylate were accurately weighed and added dropwise to the solution over about 1 hour. After the reaction is conducted at room temperature for another 12 hours, the resulting reaction product was washed with a large amount of water, and then dehydrated and filtered to obtain the raw product. Then, the methylene chloride was evaporated to obtain a siloxane macromer (A).

(3) The Properties Of Siloxane Macromer (A)

IR spectroscopy:
  (i) Absorption bands derived from Si—CH$_3$ at 802 cm$^{-1}$ and 1259 cm$^{-1}$.
  (ii) An absorption band derived from Si—O—Si at 1032 cm$^{-1}$ and 1100 cm$^{-1}$.
  (iii) An absorption band derived from C=O of methacryloyl group at 1720 cm$^{-1}$.

NMR spectroscopy:
  (i) A peak derived from Si—CH$_3$ at around 0.1 ppm.
  (ii) A peak of methyl protons derived from isophorone diisocyanate at around from 0.8 to 1.2 ppm.
  (iii) A peak derived from methyl protons of methacryloyl group at around 1.92 ppm.
  (iv) A peak of vinyl protons of methacryloyl group at around 5.55 ppm and 6.11 ppm.

B. Synthesis of Siloxane Macromer (B)

(1) The reaction scheme of siloxane macromer (B) is shown as follow:

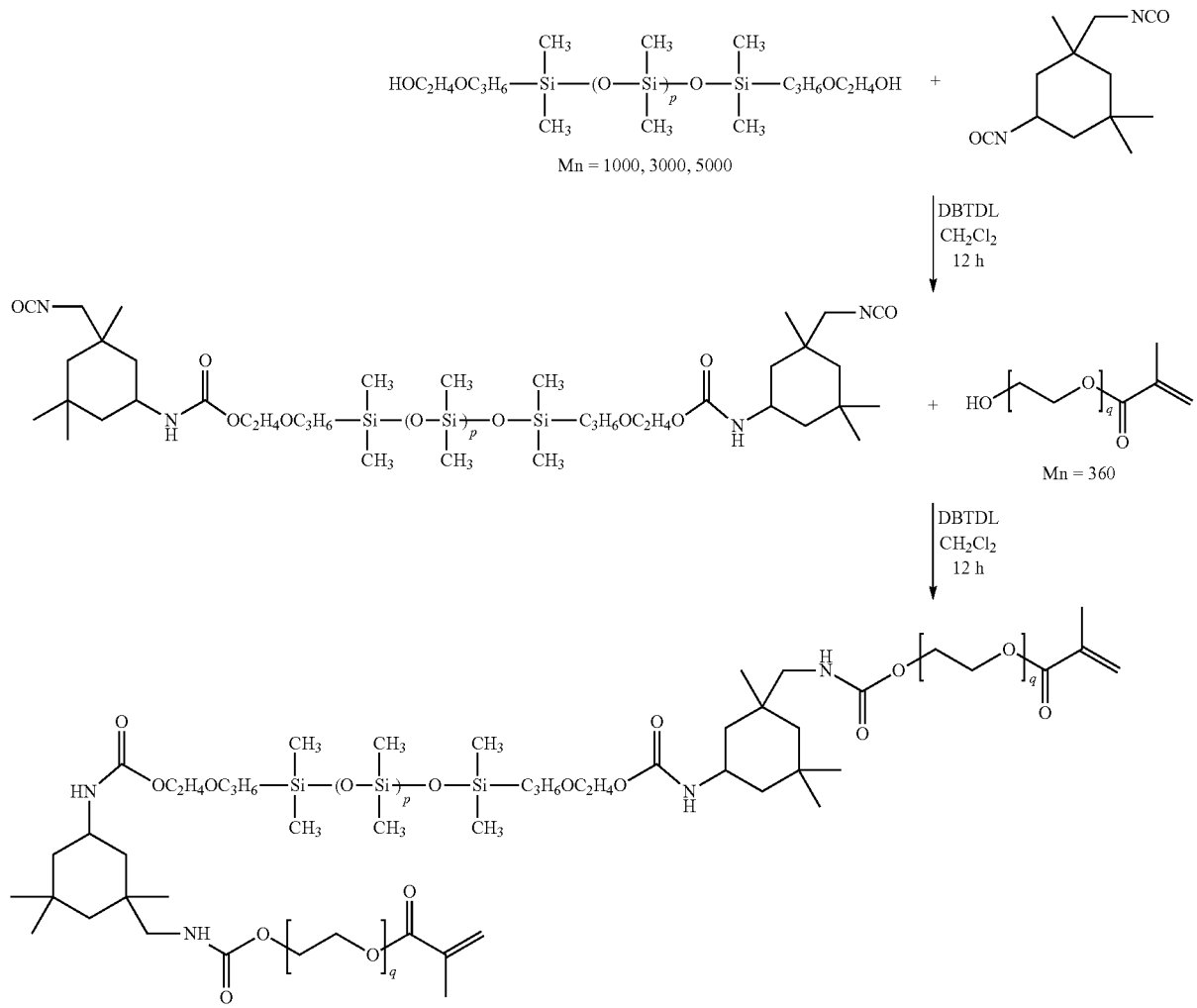

(2) The Preparation Of Siloxane Macromer (B)

8.88 g of isophorone diisocyanate, 0.0025 g of dibutyltin dilaurate as the catalyst, and 40 mL of methylene chloride were added to a flask, and the solution was stirred under a stream of nitrogen. Then, 20 g of α-butyl-ω-[3-(2,2-(dihydroxymethyl)butoxy)propyl]polydimethylsiloxane was accurately weighed and added dropwise to the solution over about 1 hour. After the reaction at room temperature for 12 hours, another 0.0025 g of dibutyltin dilaurate and 14.4 g of polyethylene glycol monomethacrylate were accurately weighed and added dropwise to the solution over about 1 hour. After the reaction at room temperature for another 12 hours, the resulting reaction product was washed with a large amount of water, and then dehydrated and filtered to obtain a raw product. Then, the methylene chloride was evaporated to obtain a siloxane macromer (B)

(3) The Properties Of Siloxane Macromer (B)

IR spectroscopy:
- (iv) Absorption bands derived from Si—$CH_3$ at 802 $cm^{-1}$ and 1259 $cm^{-1}$.
- (v) An absorption band derived from Si—O—Si at 1032 $cm^{-1}$ and 1100 $cm^{-1}$.
- (vi) An absorption band derived from C=O of methacryloyl group at 1720 $cm^{-1}$.

NMR spectroscopy:
- (v) A peak derived from Si—$CH_3$ at around 0.1 ppm.
- (vi) A peak of methyl protons derived from isophorone diisocyanate at around from 0.8 to 1.2 ppm.
- (vii) A peak derived from methyl protons of methacryloyl group at around 1.92 ppm.
- (viii) A peak of vinyl protons of methacryloyl group at around 5.55 ppm and 6.11 ppm.

2. Preparation of Contact Lenses (1) The Preparation Steps

A siloxane macromer and a hydrophilic monomer were mixed as the weight percentages shown in Table 1, and a dye and an UV-blocking agent were additionally added to make the contact lenses easily to be recognized and prevent UV light. The initiator was added into the mixture. The mixture was then injected into a mold of contact lens made of polypropylene(PP) and heated to initiate the radical polymerization thereof to obtain a heat-reaction silicone hydrogel contact lenses with high oxygen permeability.

TABLE 1

The recipe of contact lenses according to the present invention

| | |
|---|---|
| Siloxane macromer (A) | 15~60% |
| Siloxane macromer (B) | 0~30% |
| NVP | 30~75% |
| HEMA | |
| EDGMA | 0~10% |
| ADVN | 0.1~1% |

(2) The Preparation of the Contact Lenses of Example 1-Example 8

A siloxane macrome (A), a siloxane macrome (B), 2-hydroxyethyl methacrylate (HEMA) and N-vinylpyrrolidone (NVP), an azobisisoheptonitrile (ADVN) and an ethylene glycol dimethacrylate (EGDMA) were mixed at the amounts shown in Table 2 for Example 1-Example 8, respectively and stirred about 1 hour.

Then, the mixtures were injected into a mold of contact lens made of polypropylene(PP) and heated to initiate the radical polymerization thereof at 60° C. for 1 hour, at 80° C. for 2 hours and then, at 135° C. for 2 hours.

After the polymerization was completed, the mold was immersed in 80% alcohol solution for 1 hour and the resulting molded lens was taken out of the mold. The resulting lens was conducted a hydration treatment to obtain a contact lenses with excellent oxygen permeability. Finally, a sterilizing treatment on the lens was conducted. The steps and the conditions of hydration treatment and sterilizing treatment were as follow:

The steps of hydration treatment of the contact lens
(a) The mold was immersed in 80% alcohol solution for 1 hour then the resulting molded lens was taken out of the mold.
(b) The polymer resulting molded lens was then immersed in 90% alcohol solution for 1 hour.
(c) The alcohol-immersed contact lens was heated water at 80° C. for 1 hour.
(d) The contact lens was immersed in a buffer solution to obtain equilibrium.

The conditions of sterilizing treatment: 121° C. for 30 minutes.

TABLE 2

The composition of contact lenses of Example 1-Example 8

| Item | Composition | Function | Example (wt %) 1 | 2 | 3 | 4 | 5 | 6 | 7 | 8 |
|---|---|---|---|---|---|---|---|---|---|---|
| Ingredients | Siloxane macrome (A) | Siloxane macrome | 20.9 | 20.9 | 20.9 | 41.8 | 41.8 | 41.8 | 38.6 | 38.8 |
| | Siloxane macrome (B) | Siloxane macrome | 20.9 | 18.8 | 16.7 | 6.3 | 6.3 | 6.3 | 5.8 | 0 |
| | NVP | Hydrophilic monomer | 51.2 | 51.2 | 51.2 | 44.9 | 43.9 | 41.8 | 41.5 | 48.5 |
| | HEMA | Hydrophilic monomer | 6.3 | 6.3 | 6.3 | 6.3 | 6.3 | 6.3 | 13.5 | 4.8 |
| | EDGMA | Crosslinking agent | 0 | 2.1 | 4.2 | 0 | 1 | 3.1 | 0 | 7.3 |
| | ADVN | Initiator | 0.7 | 0.7 | 0.7 | 0.7 | 0.7 | 0.7 | 0.7 | 0.7 |
| Total | | | 100 | 100 | 100 | 100 | 100 | 100 | 100 | 100 |
| Total/Solvent | Hexanol | Solvent | 25.1 | 25.1 | 25.1 | 25.1 | 25.1 | 25.1 | 9.7 | 32 |

(3) Physical Property Tests

The results of physical property tests of Comparative Example 1 (O₂OPTiX, commercially available from Ciba,) Comparative Example 2 (PureVision, commercially available from B&L) and Example 1-Example 8 of the present invention were shown as the following Table 3.

TABLE 3

The result of physical property tests

| Item | Example 1 | 2 | 3 | 4 | 5 | 6 | 7 | 8 | Comparative Example 1 | 2 |
|---|---|---|---|---|---|---|---|---|---|---|
| Water content (%) | 49.8 | 34.9 | 27.3 | 30.1 | 48.8 | 29.2 | 53.23 | 51.5 | 36 | 33 |
| Modulus (Mpa) | 0.41 | 0.4 | 0.44 | 0.42 | 0.41 | 0.4 | 0.68 | 0.58 | 1 | 0.93 |
| Tension (g) | 12 | 15 | — | 22 | 14 | — | 89 | 37 | 103 | 60 |
| Oxygen permeability (Dk) | 118 | 81.8 | 89 | 150 | 138.6 | 124.3 | 100 | 101 | 75 | 84 |

As shown in Table 3, the contact lenses according to the present invention have more excellent oxygen permeability than comparative examples. Moreover the oxygen permeability of Example 1, Example 4, Example 6, Example 7 and Example 8 are higher than 100, and the oxygen permeability of Example 4 is even up to 150. In addition, the water content of Example 1, Example 5, Example 7 and Example 8 are more than 45%, but the water content of Comparative Example 1 and Comparative Example 2 are only 36% and 33%, respectively.

According to the present invention, the contact lenses have more excellent oxygen permeability and water content than the conventional contact lenses.

While the invention has been described by way of example(s) and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A composition for manufacturing contact lenses comprising:

a siloxane macromer represented by the following formula (I):

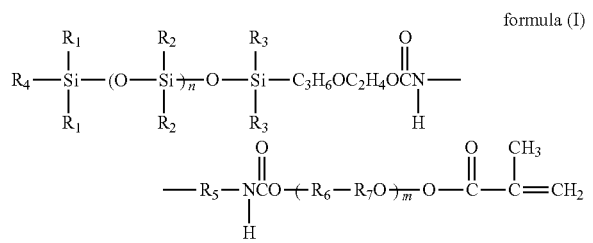

formula (I)

wherein R1, R2 and R3 are independently C1-C4 alkyl groups, R4 is C1-C6 alkyl group, R5 is a residue obtained by removing NCO group from an aliphatic or aromatic diisocyanate, R6 and R7 are independently alkylene groups, and n is an integer of 4-80, m is an integer of 3-40, and wherein the molecular weight of the siloxane macromer of formula (I) is 1,000 to 10,000;

a siloxane macromer represented by the following formula (II):

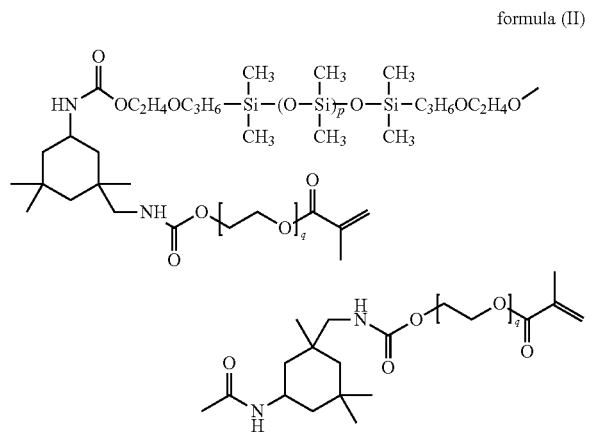

formula (II)

wherein p is an integer of 4-80 and q is an integer of 3-40;

a hydrophilic monomer, wherein the hydrophilic monomer is selected from a group consisting of 2-hydroxyethyl methacrylate (HEMA), N-vinylpyrrolidone (NVP), methyl acrylic acid, acrylic acid, glycidyl methacrylate, (methyl)acrylamide, N,N-dimethylacrylamide, vinyl bamate and a combination thereof;

a crosslinking agent; and an initiator.

2. The composition for manufacturing contact lenses according to claim 1, wherein the hydrophilic monomer is a combination of HEMA and NVP.

3. The composition for manufacturing contact lenses according to claim 1, wherein the crosslinking agent is selected from a group consisting of ethylene glycol dimethacrylate (EGDMA), tetraethylene ethylene glycol dimethacrylate (TEGDMA), tetraethylene ethylene glycol dimethacrylate (TrEGDMA), Poly(ethylene glycol) dimethacrylate, trimethylolpropane trimethacrylate, vinyl methacrylate, ethylenediamine dimethyl acrylamide, glycerol dimethacrylate, triallyisoeyanurate and triallyl cyanurate.

4. The composition for manufacturing contact lenses according to claim 1, wherein the initiator is selected from a group consisting of azobisisoheptonitrile (ADVN), 2,2'-azobis(isoheptonitrile) (AIBN), 2,2'-azobis(2,4-dimethylvaleronitrile), 2,2'-azobis(2-methyl-propanenitrile), 2,2'-azobis(2-methyl-butanenitrile) and benzoyl peroxide.

5. The composition for manufacturing contact lenses according to claim 1, wherein the siloxane macromer of formula (I) is present at an amount of 30 to 40 parts by weight, the hydrophilic monomer is present at an amount of 40 to 65 parts by weight, the crosslinking agent is present at an amount of 1 to 10 parts by weight and the initiator is present at an amount of 0.1 to 1 parts by weight based on the total amount of the composition.

6. The composition for manufacturing contact lenses according to claim 5, wherein the hydrophilic monomers is a combination of HEMA and NVP, wherein the HEMA is present at an amount of 1 to 5 parts by weight and the NVP is present at an amount of 40 to 60 parts by weight based on the total amount of the composition.

7. The composition for manufacturing contact lenses according to claim 1, wherein the siloxane macromer of formula (I) is present at an amount of 20 to 45 parts by weight, the hydrophilic monomer is present at an amount of 40 to 75 parts by weight, the crosslinking agent is present at an amount of 1 to 5 parts by weight, the siloxane macromer of formula (II) is present at an amount of 5 to 20 parts by weight and the initiator is present at an amount of 0.1 to 1 parts by weight based on the total amount of the composition.

8. The composition for manufacturing contact lenses according to claim 7, wherein the hydrophilic monomer is a combination of HEMA and NVP, wherein the HEMA is present at an amount of 1 to 20 parts by weight and the NVP is present at an amount of 40 to 55 parts by weight based on the total amount of the composition.

9. The composition for manufacturing contact lenses according to claim 1, wherein the siloxane macromer of formula (I) comprising a siloxane macromer represented by the following formula (III):

formula (III)

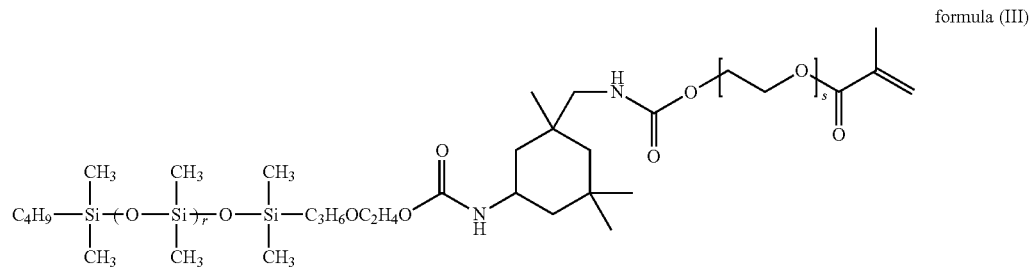

wherein r is an integer of 4-80 and s is an integer of 3-40.

10. A composition for manufacturing contact lenses comprising:
a siloxane macromer represented by the following formula (I):

formula (I)

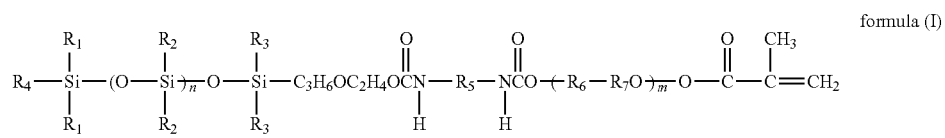

wherein R1, R2 and R3 are independently C1-C4 alkyl groups, R4 is C1-C6 alkyl group, R5 is a residue obtained by removing NCO group from an aliphatic or aromatic diisocyanate, R6 and R7 are independently alkylene groups, and n is an integer of 4-80, m is an integer of 3-40, and wherein the molecular weight of the siloxane macromer of formula (I) is 1,000 to 10,000;
a hydrophilic monomer, wherein the hydrophilic monomer is selected from a group consisting of 2-hydroxyethyl methacrylate (HEMA), N-vinylpyrrolidone (NVP), methyl acrylic acid, acrylic acid, glycidyl methacrylate, (methyl)acrylamide, N,N-dimethylacrylamide, vinyl bamate and a combination of said materials thereof;
a siloxane macromer represented by the following formula (II):

wherein p is an integer of 4-80 and q is an integer of 3-40; and
an initiator.

11. The composition for manufacturing contact lenses according to claim 10, wherein the siloxane monomer of formula (I) is present at an amount of 15 to 45 parts by weight, the hydrophilic monomer is present at an amount of 40 to 75 parts by weight, the siloxane monomer of formula (II) is present at an amount of 5 to 30 parts by weight and the initiator is present at an amount of 0.1 to 1 parts by weight based on the total amount of the composition.

12. The composition for manufacturing contact lenses according to claim 11, wherein the hydrophilic monomer is a combination of 2HEMA and NVP, wherein the HEMA is present at an amount of 1 to 15 parts by weight and the NVP is present at an amount of 40 to 60 parts by weight based on the total amount of the composition.

formula (II)

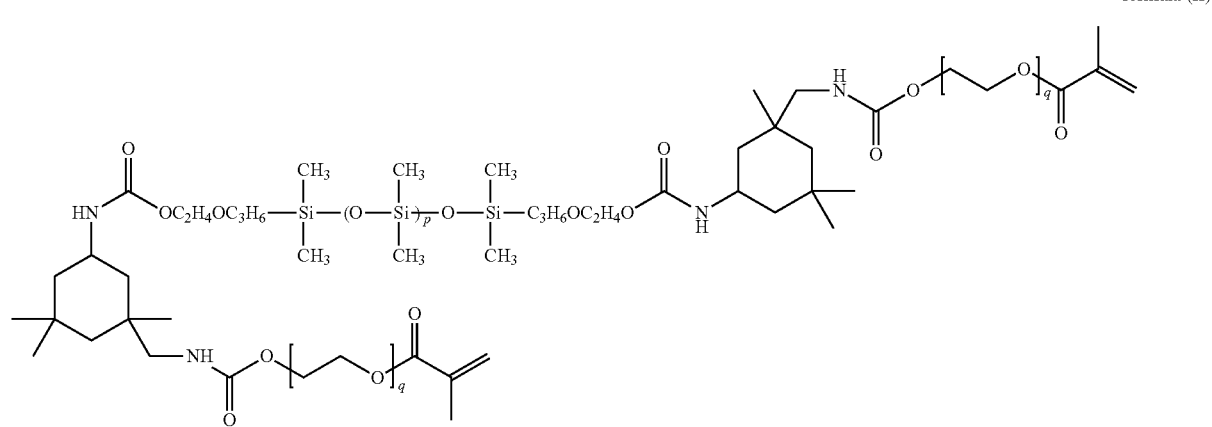

13. The composition for manufacturing contact lenses according to claim 10, wherein the siloxane macromer of formula (II) provides a crosslinking function.

* * * * *